Dec. 6, 1966   J. WERNER   3,290,087
SLIDING ROOF CONSTRUCTION FOR VEHICLES
Filed Sept. 24, 1963   4 Sheets-Sheet 1
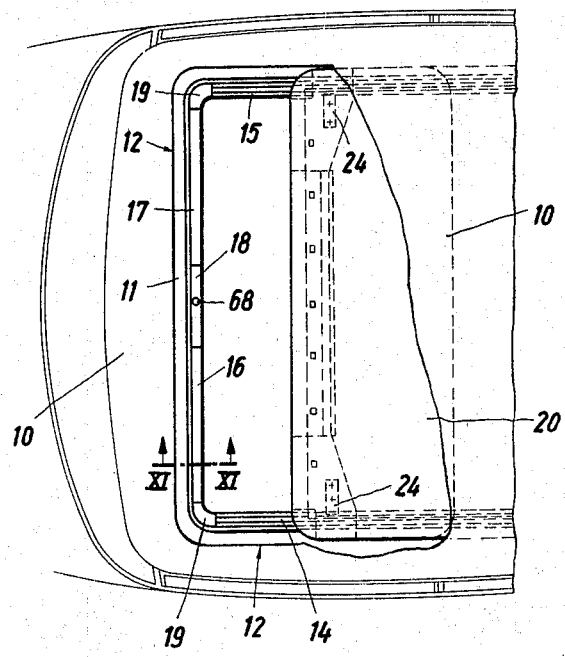
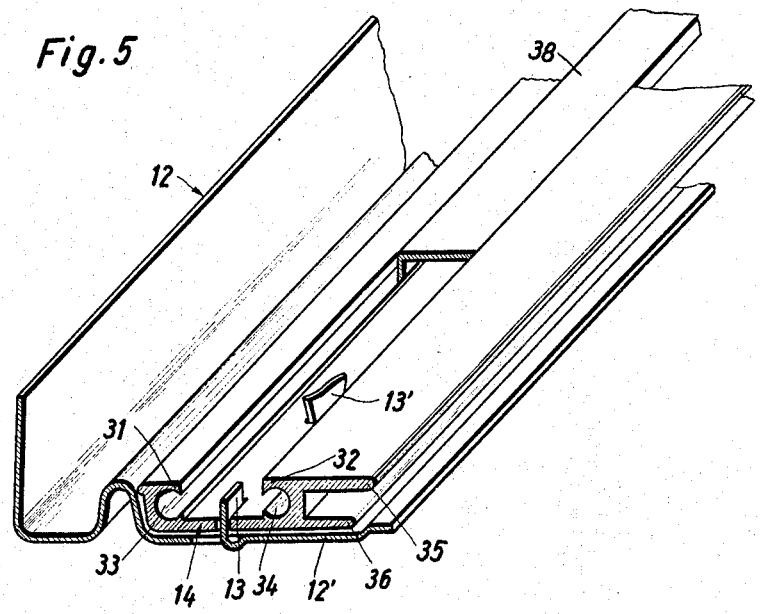

Dec. 6, 1966  J. WERNER  3,290,087
SLIDING ROOF CONSTRUCTION FOR VEHICLES
Filed Sept. 24, 1963  4 Sheets-Sheet 2
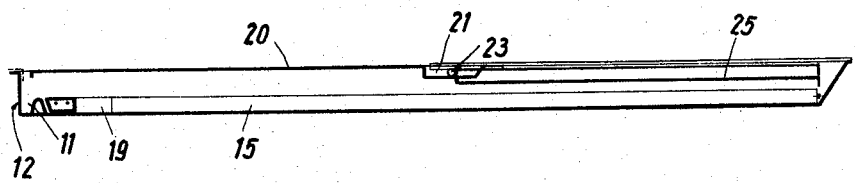
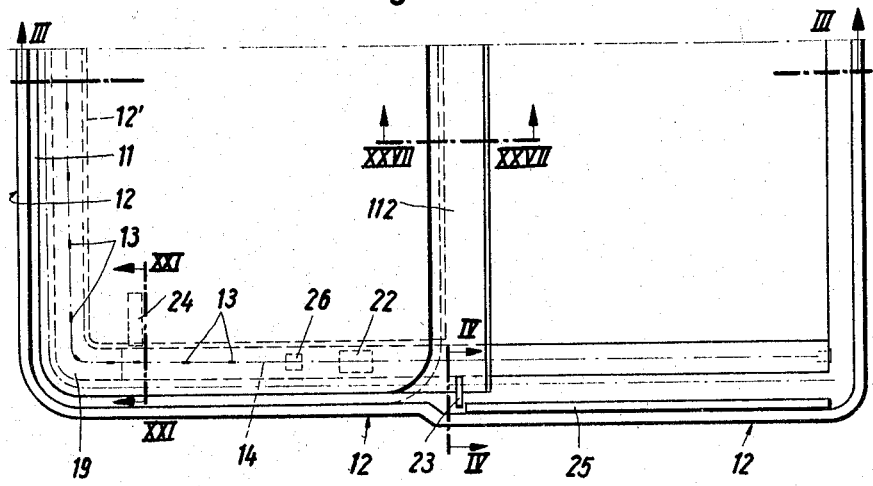
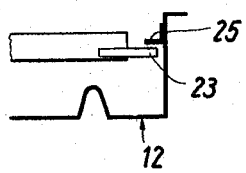

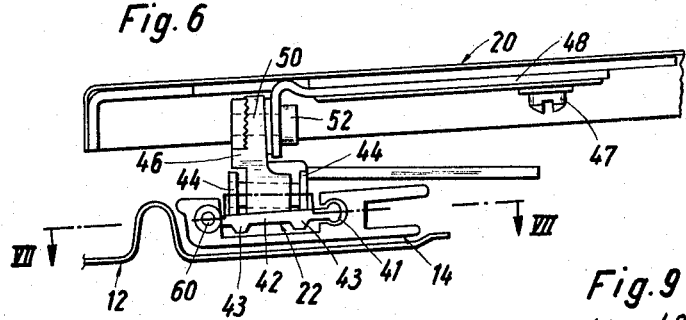
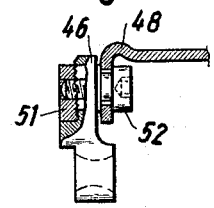
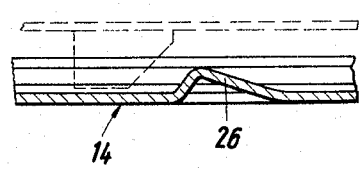
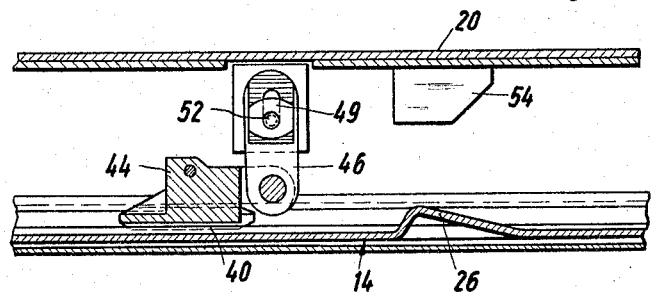
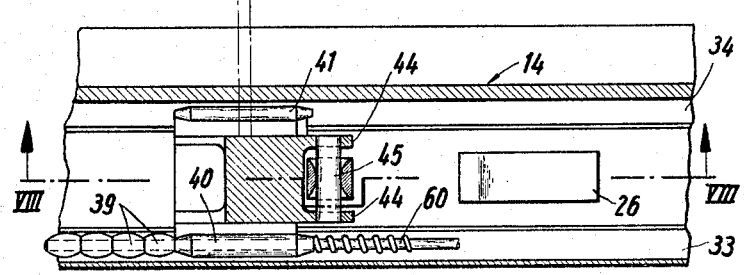

Dec. 6, 1966     J. WERNER     3,290,087
SLIDING ROOF CONSTRUCTION FOR VEHICLES
Filed Sept. 24, 1963     4 Sheets-Sheet 4
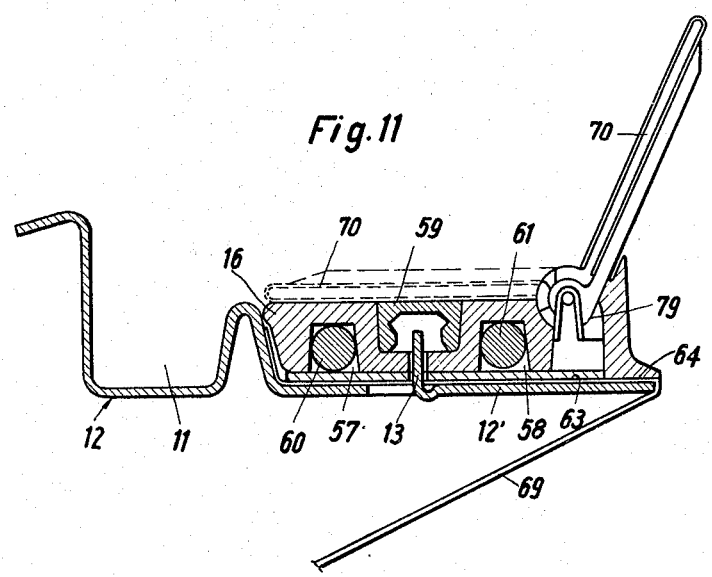
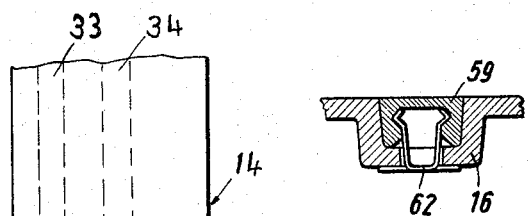
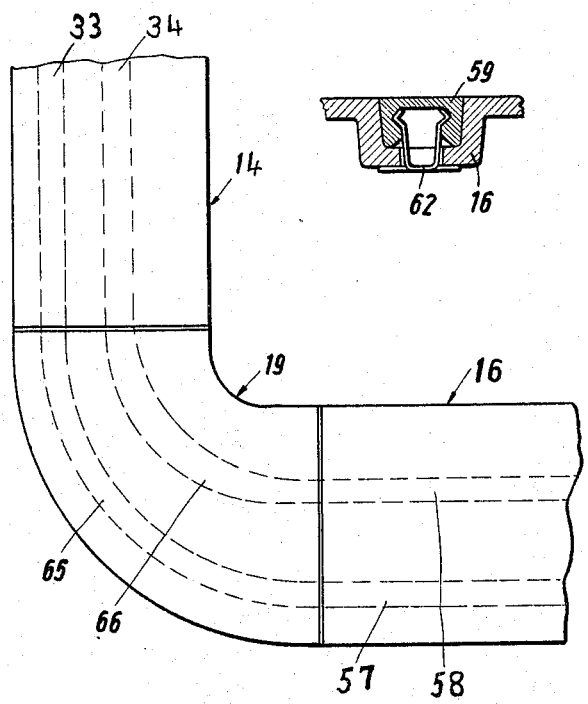

United States Patent Office 3,290,087
Patented Dec. 6, 1966

3,290,087
SLIDING ROOF CONSTRUCTION FOR VEHICLES
Johannes Werner, Offenbach (Main), Germany, assignor to H. T. Golde G.m.b.H. & Co. K.G., Frankfurt am Main, Germany
Filed Sept. 24, 1963, Ser. No. 311,190
Claims priority, application Germany, Sept. 26, 1962,
G 36,005
17 Claims. (Cl. 296—137)

The invention relates to a sliding roof construction for motor vehicles having guide rails for the sliding roof and its driving cables, said rails being mounted laterally on a sliding roof frame. More particularly the invention is concerned with a sliding roof construction wherein the sliding roof consists of a rigid sliding panel whose rear edge must be somewhat lowered before opening before the sliding panel can be displaced rearwards along the lateral guide rails.

It is known to drive a sliding roof by means of cables which extend along the lateral guide rails to a suitable drive, which can consist for example of an electric motor or a hand crank. An object of the invention is to provide a sliding roof construction with drive transmission inclusive of axially movable cables in such a manner that a minimum amount of space is required in the height. This is intended to avoid reducing the head room in the interior of a vehicle fitted with a sliding roof as compared with a motor car having an ordinary roof. Associated with this object is the further object of constructing and arranging all the parts necessary for mounting and operating the sliding panel, despite the necessity of maintaining a low overall height, such that parts projecting into the interior of the car or into the roof aperture are avoided and nevertheless reliable operation is guaranteed. A further object is to construct the individual parts so that they are easy to assemble and that adjustment is simple, since these measures considerably influence the economic aspect of the entire construction.

The solution of this problem is made possible primarily by a special construction of the guide rails which are mounted laterally on the sliding roof frame and which according to the invention are characterized in that they comprise an upwardly open channel section whose free, inwardly directed ends engage over a guiding slide connected to the sliding roof, the said slide being connected to a driving cable likewise guided within the channel section. In this way a connecting point between the sliding panel and the slide and the connection between the slide and the drive cable can be taken substantially into the open channel section, and the internal clear height of the section need only be adapted to the thickness of the drive cable i.e. can be kept small.

The connection between the slide and the sliding panel is expediently effected by means of an adjustable-length joint arm pivotally connected substantially symmetrically with respect to the longitudinal central plane of the slide, so that the guiding slide is uniformly loaded at both sides. Jamming of the slide in its guide is also effectively prevented by the fact that the slide is guided at both sides by the rail.

For mounting and fixing the guide rails on the lateral parts of the roof frame, according to a further feature of the invention an inwardly directed, approximately horizontal flange of the frame is used which is constructed with supports in the form of punched, bendable tongues which engage through appropriate slots on the bottom of the guide rail and are secured by bending over or otherwise deforming their free ends above the slots. Special fixing means and bearings are not required owing to the provision of such supports, which can also be used advantageously for the fixing of other parts to the sliding roof frame.

It is also proposed according to the invention to construct the lateral guide rails with two cable guides which are situated spaced apart substantially horizontally from one another, these lateral cable guides being connected with two further guide ducts, also disposed horizontally side by side, in a cable guide strip mounted on a transverse part of the frame through the agency of end elements having two curved ducts situated side by side in each case. The guide ducts at the transverse part of the frame are intended to receive the cables from the sliding roof, along both sides of a driving wheel so that when the wheel is turned through the agency of a suitable drive the cables are moved in opposite directions relative to one another to move the sliding panel in either a closing or opening sense.

Further details and advantages of the invention will be apparent from the embodiment described hereinafter with reference to the drawings wherein:

FIGURE 1 is a plan view of the front part of a motor vehicle with a sliding roof construction according to the invention, the sliding roof being partly opened;

FIGURE 2 is a plan view, showing half of the sliding roof frame with the sliding panel;

FIGURE 3 is a sectional view on the line III—III of FIGURE 2;

FIGURE 4 shows a sectional view of a detail, taken on the line IV—IV of FIGURE 2;

FIGURE 5 is a perspective view showing a fragment of the lateral frame part and the guide rail fixed thereto;

FIGURE 6 is a vertical sectional view through the guiding slide and the lateral frame part with sliding panel;

FIGURE 7 is a sectional view taken on the line VII—VII of FIGURE 6 and turned through 90°;

FIGURE 8 is a sectional view taken on the line VIII—VIII of FIGURE 7;

FIGURE 9 is a vertical sectional view through the articulated connection between the guiding slide and the sliding panel;

FIGURE 10 is a partial view of FIGURE 8 showing the sliding panel in another closed position in dotted outline;

FIGURE 11 is a sectional view taken along line XI—XI in FIG. 1;

FIGURE 12 shows a detail in a sectional view parallel to the section plane of FIGURE 11;

FIGURE 13 is a diagrammatic plan view showing the connection of the forward and lateral guide ducts by a corner element.

An example of embodiment of the sliding roof construction according to the invention is shown in general schematic view in FIGURES 1, 2 and 3. According to FIGURE 1, the fixed vehicle roof 10 has a sliding roof frame 12 secured therein. Guide rails 14 and 15 are mounted on the side parts of the frame 12. Mounted on the forward transverse part of the frame are guide strips 16 and 17 which are connected by a central element 18. The lateral guide rails 14 and 15 are connected to the forward guide strips 16 and 17 by corner elements 19 in each case. The rigid sliding panel 20 slides by means of suitable guides (which will be described later) along the lateral guide rails 14 and 15. Upon opening, the rear edge of the sliding panel 20 is first lowered slightly in order that the sliding panel can be pushed below the fixed vehicle roof 10. This rear part of the vehicle roof 10 is not shown in FIGURE 1, for the sake of clarity.

FIGURE 2 shows diagrammatically the position of a rear guiding slide 22 connected in articulated fashion to the sliding panel, and a substantially rigid forward guide shoe 24, while 26 designates a projection arranged on the lateral guide rail 14 and which serves in a known manner as a ramp for effecting the vertical movement of the rear edge of the panel 20. (This will be explained in greater detail hereafter.)

In FIGURE 2 the rear part of the frame 12, i.e., the right-hand part in the drawing, is slightly enlarged in order to show the details of the sliding roof construction according to the invention, but the latter can also be provided without such enlargement of the frame. As shown in FIGURE 3, the sliding panel 20 comprises along the rear edge an offset portion 21 to which a pin 23 is fixed to project laterally at both sides. This pin 23 when the rear edge of the panel is lowered is situated below a horizontal flange 25 of a rail rigidly fixed to the sliding roof frame 12. This guarantees that in the partly or fully opened position the sliding panel 20 cannot be lifted by vibrations of the vehicle or by a suction effect from the relative wind speed, which might cause damage to the paint on its outer surface.

FIGURE 5 shows on a larger scale part of the left-hand side of the sliding roof frame 12 and the guide rail 14 fixed thereto. The rail 14 consists essentially of an upwardly open channel section whose edges 31 and 32 are directed inwardly and form guide ducts 33, 34 for the accommodation of driving cables of the sliding roof. Also, that side of the rail which is directed towards the roof aperture is constructed as a U-section with two limbs 35 and 36 between which the canopy i.e., the lower lining of the sliding panel, can slide while the upper flange 35 serves as a guide for the forward, rigid guide shoe 24 of the sliding panel (FIGURE 2).

The guide rail 14 is mounted on a flange 12' of the frame 12 which is directed towards the roof aperture. From the material of the flange 12' there are punched tongues 13 for fixing the rail 14 to the frame 12. For this purpose elongated slots are provided in the lower web of the rail 14. The tongues 13 are passed through these slots and so deformed above the slots as to prevent sliding-back. For example the upwardly projecting end of the tongue 13' is twisted in order to prevent sliding-back.

Between the edges 31 and 32 of the rail section there is inserted a substantially U-shaped cover strip 38 which can expediently be made of synthetic plastic material, in such a manner that its downwardly directed limbs bear resiliently against the edges 31, 32 while its web is situated substantially in the plane of the upper sides of the edges 31, 32. The cover strip 38 expediently extends from the corner elements 19 approximately to the region of the guide rail 14 at which the projection 26 begins. The cover strips prevent the intrusion of foreign material such as dust into the channel section of the rail 14. From the projection 26, rearwards, the open channel section of the rail 14 must be left free for the movement of the slide 22 and a nose 54 in the rearward direction (when the sliding roof is opened). The construction and the method of operation of the slide 22 will be described in more detail hereinafter with reference to FIGURES 6 to 10.

The slide 22 has two lateral sliding elements 40 and 41 which are connected rigidly by a web 42. While the sliding elements 40, 41 slide in the guide ducts 33 and 34, the web 42 bears with two ribs 43 against the bottom of the channel section of the rail 14.

One of the two rod-like sliding elements—for example the outer sliding element 40—is secured to an axially movable drive cable 60 which in known manner is provided with screw threading in order to permit engagement with a driving wheel mounted at a suitable point. The end of the cable passes through a bore in the sliding element 40 and lead-sealed against displacement as indicated at 39.

A driving wheel 68 can preferably, as shown in FIGURE 1, be secured to the vehicle for example at the forward transverse part of the sliding roof frame 12 forwardly of the roof aperture, and at the same time drive a cable coming from the right-hand side and a cable coming from the left-hand side of the sliding panel. The cables then move in opposite directions along both sides of the driving wheel 68, and their free ends run within one of the two guide ducts 33 and 34. According to the invention the cable at one side of the sliding roof is secured to the outer sliding element, for example 40, and at the other side of the sliding roof to the inner sliding element, for example 41, while the idle cable ends run in the remaining guide ducts, with the result that over-crossing of the cables is advantageously avoided, with an appropriate saving in overall height. Due to the substantially symmetrical construction of the guiding slide 22, satisfactory guidance of the panel 20 is not interfered with by the different fixing of the cables on the slide at the two sides of the sliding panel.

When manufacturing guide rails 14, 15 by extrusion, manufacturing tolerances must be allowed for to a certain extent, and conveniently one of the two sliding elements, for example the element 41, can be constructed with reduced cross-sectional width. There is then a slight amount of play in the guide duct which compensates for manufacturing tolerances.

The web 42 of the slide has lateral bearing flanges 44 for a fixed shaft 45 on which a joint arm 46 is pivotably mounted, which constitutes the connection between the slide 22 and the sliding panel 20 through the agency of a hook arm 48 fixed rigidly on the sliding panel by means of a screw 47.

In order to permit accurate adjustment of the spacing between the slide 22 and the panel 20, the joint arm 46 is provided with a slot 49 and a profiled surface 50 against which a surface provided with a complementary profile on a small plate 51 provided with internal screwthreading bears. A screw 52 inserted through the hook of the arm 48 and through the slot 49 engages in the screwthreading of the plate 51. By means of the screw 52, the parts 46 and 51 can be secured in a particular setting after the desired overall height for the connected parts has been fixed by suitable choice of the setting of the parts 46 and 51 which are adjustable relatively to one another in the vertical sense. This vertical adjustment makes it possible for the sliding panel 20 to be adjusted accurately in the closed position to the height of the fixed vehicle roof.

FIGURES 6 to 8 show the joint arm 46 in the position which it assumes when the sliding panel 20 is closed. When the sliding panel 20 is lowered for sliding-back, the cable 60 urges the slide 22 rearwardly (i.e. to the left hand side in FIGURES 7 and 8) and in so doing entrains the bearing shaft 45 for the joint arm 46, whereby the joint arm is swung downwardly and the panel 20 lowered. The joint arm then takes up a position in which the axes of the shaft 45 and the screw 52 are situated substantially in the same horizontal plane.

When the sliding roof is closed, the slide 22 is drawn forwards. When the forward position of the panel is reached, the nose 54 arranged on the panel runs on to the ramp 26 which is formed from the bottom of the guide rail 14 and which first of all slightly raises the panel 20. As a result, the pivoting movement of the joint arm 46 in the upward direction into the position shown in FIGURE 8 is initiated and this movement is ended by further drawing forwards of the slide 22.

FIGURE 11 shows a cross-section through the forward transverse part of the roof frame 12 with the guide strip 16 fixed thereto. It shows additionally the mounting of a pivotable wind deflector 70 in bearings 79 on the guide strip 16. The forward transverse part of the frame 12 is so profiled, like the two side parts of the frame, to form a through rain gutter 11 with a substantially horizontal flange 12' extending towards the roof aperture. The guide strip 16 forms two downwardly open guide ducts 57, 58 which are situated adjacent one another with spacing therebetween, for the accommodation of drive cables 60, 61 coming from both sides of the sliding panel. Here again, the securing to the frame flange 12' is effected by bent-over tongues 13.

A smooth surface is obtained by a profiled cover strip 59. The strip 59 is fixed by clips 62 to the guide strip 16, as shown in FIGURE 12. A strip 63 of sheet metal or synthetic plastic material can expediently be provided as a backing for the guide strip 16 in order to compensate for unevenness in the flange 12'. A small flange 64 of the strip 16 covers the fabric lining 69 of the interior of the vehicle from above. FIGURE 13 shows diagrammatically the connection of the cable guide ducts 33, 34 in the lateral guide rails with the guide ducts 57 and 58 of the forward guide strip through the agency of rounded corner elements 19 which are given a profile substantially corresponding to the forward guide strip 16, and are provided with two curved guide ducts 65 and 66 which extend side by side in spaced relation from one another. Owing to the lateral spacing of the two ducts 66 and 65, which increases with the transition from the side part to the front part of the frame, a considerable difference is formed between the radii of curvature of the two ducts. In order to keep the radius of the corner element 19 as a whole relatively small, a particularly small radius of curvature must be accepted for the cable which is guided in the inner duct 66, and with normal dimensioning of the duct 66 this small radius of curvature would hinder movement of the cable and cause considerable wear on the guideway. In order to avoid this, without increasing the radii of curvature of the ducts 65, 66 and of the corner element to a substantial extent, at least the inner duct 66 is widened in the region of curvature so that the relevant cable can be slid through the curved duct 66 with a fraction of the force otherwise required. The corner elements 19 preferably consist of synthetic plastic material.

For driving the two cables 60, 61 in opposite directions, the central part 18 (FIGURE 1) of the forward guide strip can be constructed for supporting the driving toothed wheel 68 which drives the screwthreaded cable in the manner of a rack and pinion drive. The driving wheel 68 is connected to a suitable drive (not shown) for example by means of a hand crank or an electric motor.

The embodiment which has been described shows that according to the invention a sliding roof construction with operation of a sliding panel by means of cables or the like which act laterally on the panel and are taken through ducts to a driving wheel, can be kept flat as regards all the parts which are important to the dimensions of the overall height of the sliding panel with its sliding roof frame, to an extent which has not been possible in hitherto known constructions. Independently of details in the example of embodiment described hereinbefore, in this respect the possibility of guiding two cables beside one another in the region of the frame and without crossing over one another is particularly advantageous, likewise the compact-height construction of a spring-operated wind deflector operating automatically upon operation of the sliding roof, also the use of a bilaterally guided slide as support for an articulated connection to the lowerable rear region of the sliding panel with selective connection of the outer or the inner runner, constructed as sliding element, to the active, i.e. drive-transmitting cable. Extremely advantageous also is the fixing of the guide rail by means of its central web, since this makes it possible to dispense with the otherwise generally provided lateral bearing flange on the rail, so that the overall width of the rail also need not go beyond the width of known rails having a bearing flange and guide ducts situated one above the other, despite the arrangement of the guide ducts side by side, while a considerable reduction in overall height can be obtained.

I claim:

1. A sliding roof construction for a motor vehicle having a roof frame bounding an opening in the roof of the vehicle and a sliding roof movable between open and closed positions, said construction comprising lateral guide rails on the roof frame guidably supporting the sliding roof for movement, means for displacing the sliding roof also guidably supported by the guide rails, each guide rail including a section having an upwardly open channel and inwardly directed free ends above said channel, and slides secured to the sliding roof and accommodated in respective guide rails with the ends of the guide rails extending over the slides to hold the same in the respective rail, said means for displacing the sliding roof, being connected to said slides and being supported by the guide rails substantially in the same plane as the slides.

2. A roof construction as claimed in claim 1 wherein said means for displacing the sliding roof includes a drive cable connected to each slide and guidably supported by the guide rails.

3. A roof construction as claimed in claim 2 wherein each guide rail is provided with at least one duct constituting a cable guide which extends longitudinally in the same horizontal plane as the slide, and immediately adjacent said channel, said drive cable being accommodated in the duct.

4. A roof construction as claimed in claim 1 comprising a profiled strip supported in each guide rail covering the upwardly open channel for a portion of its length, said profiled strip including downwardly directed flanges laterally engaged with said free ends.

5. A roof construction as claimed in claim 2 wherein said frame has a forward transverse portion, the construction comprising a cable guide strip on said forward transverse portion of the frame provided with a guide duct for receiving the drive cable extending from the lateral guide rails.

6. A roof construction as claimed in claim 5 wherein the cable guide strip comprises a first profiled strip which defines an open duct, and a second strip which closes the duct.

7. A roof construction as claimed in claim 6 comprising corner elements joining a respective lateral guide rail and the forward guide strip, each of said corner elements having a curved duct extending between the cable guide in the channel section of the associated guide rail and the guide duct in the forward guide strip.

8. A roof construction as claimed in claim 7 wherein each of the guide rails and the corner elements are provided with two ducts in the same horizontal plane and the guide strip is provided with two corresponding ducts, the drawing cable for each slide passing in one of the ducts of the respective guide rail corner element and guide strip on one side of the vehicle and into the unoccupied corresponding ducts on the other side of the vehicle, at least one duct of each corner element being widened in order to reduce the friction when the cable moves in the corner elements.

9. A roof construction as claimed in claim 1 wherein the roof frame comprises a flange including punched, bendable tongues which are engaged with the guide rails.

10. A roof construction as claimed in claim 9 wherein said rails have slots through which said tongues extend, said tongues having free ends which are deformed to thereby secure the rails with the flange of the roof frame.

11. A roof construction as claimed in claim 3 wherein each slide includes a lateral sliding element which is substantially rod-shaped and which slides in the cable guides and is connected to the drive cable.

12. A roof construction as claimed in claim 11 wherein each guide rail has two ducts and each slide includes two lateral sliding elements one rod-like sliding element being reduced in section and accommodated with lateral play in the associated guide.

13. A roof construction as claimed in claim 1 comprising an adjustable joint arm connected to each slide and to the sliding roof.

14. A roof construction as claimed in claim 13 wherein each joint arm comprises two elements which are relatively adjustable and have surfaces in contact which have complementary profiles and are adapted to be secured together in various positions of overlap, one of said elements of the joint arm being provided with an elongated slot, a screw engaged with the other of the elements and passing through said slot for securing said elements together, and means pivotally supported on said screw and connected to said sliding roof.

15. A roof construction as claimed in claim 11 comprising means pivotally connecting each joint arm to the respective slide substantially symmetrically with respect to a longitudinal central plane of the slide.

16. A roof construction as claimed in claim 15 wherein each guide rail has an integral deformed portion in the region of the rear end of the roof opening to form an inclined cam surface, said sliding roof including a nose operatively associated with the said cam surface to initiate pivotal movement of the joint arm when the sliding roof is closed.

17. A roof construction as claimed in claim 1 comprising a profiled strip including an inwardly directed flange fixed to the roof frame and a laterally projecting pin supported on the sliding roof and associated with the said flange to engage below the flange and thus limit undesirable vertical movement of the sliding panel when the roof is lowered as the same moves from the closed to the open position.

References Cited by the Examiner

UNITED STATES PATENTS

| | | | |
|---|---|---|---|
| 2,985,483 | 5/1961 | Bishop et al. | 160—188 X |
| 3,022,976 | 2/1962 | Zia | 248—430 |
| 3,051,232 | 8/1962 | Lamb | 160—273 X |
| 3,055,701 | 9/1962 | Golde | 296—137 |
| 3,075,807 | 1/1963 | Werner | 296—137 |
| 3,079,195 | 2/1963 | Golde | 296—137 |

RICHARD W. COOKE, JR., *Primary Examiner.*

FRANK L. ABBOTT, *Examiner.*

M. O. WARNECKE, *Assistant Examiner.*